May 31, 1955

H. S. BREMBECK 2,709,417

ROUND HOPPER FEEDER

Filed April 12, 1954

INVENTOR
H. S. Brembeck
BY Kimmel & Crowell
ATTORNEYS

United States Patent Office 2,709,417
Patented May 31, 1955

2,709,417
ROUND HOPPER FEEDER

Howard S. Brembeck, Alliance, Ohio, assignor to Chore-Time Equipment, Inc., Alliance, Ohio, a corporation of Ohio, and The Cyclone Manufacturing Co., Urbana, Ind., a corporation of Indiana, jointly Application April 12, 1954, Serial No. 422,497

4 Claims. (Cl. 119—53)

This invention relates to a hopper feeder, and has as its primary object the provision of an improved feeder for chickens or the like having means associated therewith for the manual adjustment of the amount of feed made readily accessible to fowls.

An additional object of this invention is the provision of a device of this character which may be simply and expeditiously adjusted with a minimum of time and effort.

A further object of this invention is the provision of a device of this nature wherein a relatively wide range in the quantity of available feed may be provided, and wherein such quantity is constantly maintained.

Still other objects reside in the combination of parts, arrangement of elements, and features of construction, all as will be more fully pointed out hereinafter, and disclosed in the accompanying drawing wherein there is shown a preferred embodiment of this inventive concept.

In the drawing.

Similar reference characters refer to similar parts throughout the several views of the drawing.

Figure 1:
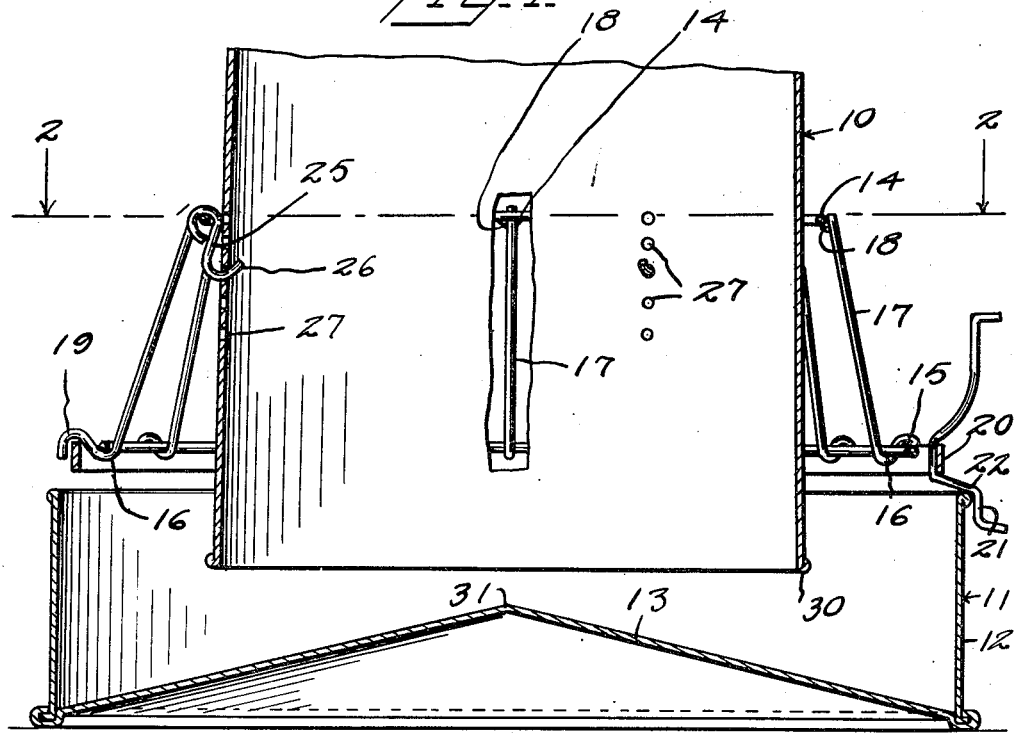
Figure 1 is a side sectional view taken substantially along the line 1—1 of Figure 2, partially broken away, of one form of device embodying the instant inventive concept.
Figure 2:
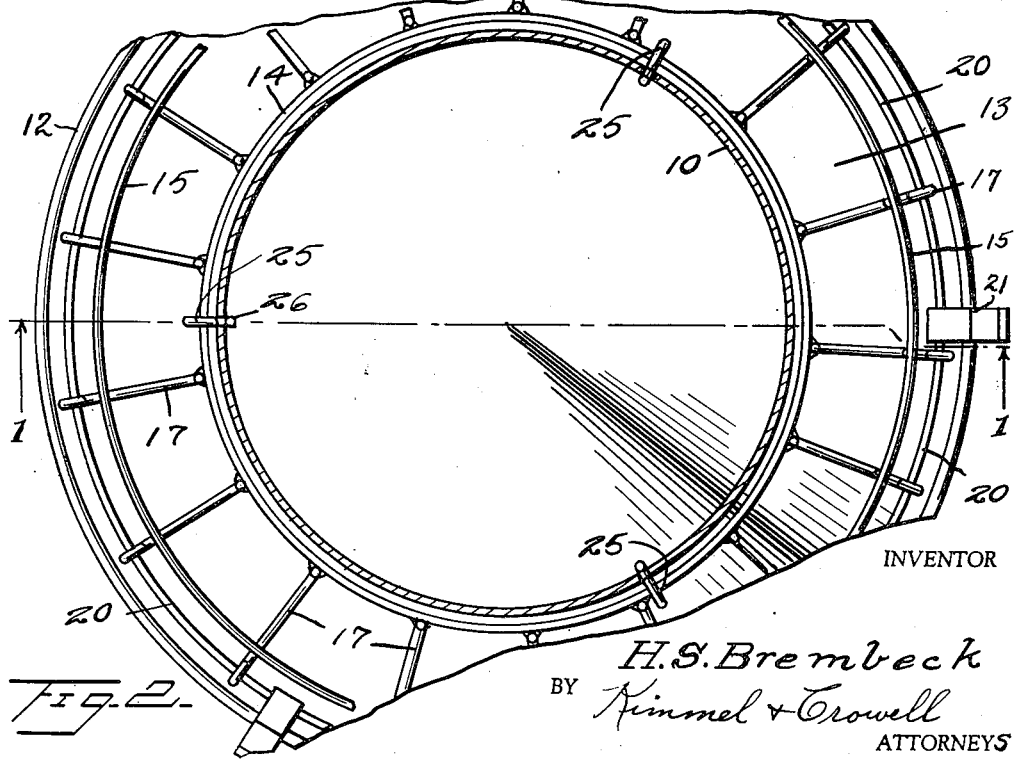
Figure 2 is a sectional view taken substantially along the line 2—2 of Figure 1 as viewed in the direction indicated by the arrows.

Referring now to the drawing in detail, there is generally indicated at 10 a cylindrical hopper of substantially conventional design, and including a top cover (not shown) of any desired conventional type. Hopper 10 is adapted to be supported, in a manner to be more fully described hereinafter, at a selected distance above the feed pan 11, of substantially conventional construction, and including an annular side wall 12, to the bottom of which is peripherally secured a conical bottom 13 to permit equal and continuous radial distribution of feed dispensed from hopper 10.

A mounting means for the hopper takes the form of an annular ring 14, closely adjacent the periphery of hopper 10, and a second annular ring 15 of slightly larger diameter is positioned therebelow. The ring 15 has suitably secured thereto, as by welding or the like, bights 16 of a plurality of radially disposed connecting members 17, the upper ends of which are suitably secured as by welding 18 to ring 14. The lower ends of members 17 beyond the bights 16 terminate in hook-shaped members 19 which are adapted to engage at spaced peripheral points over an annulus 20. The annulus 20 has suitably spaced clip members 21 positioned at spaced intervals thereabout, and provided with bight portions 22 adapted to engage over the rim 23 of pan wall 12.

Loosely mounted for rotative movement on ring 14 at suitably spaced intervals thereabout are hook-shaped members 25, each provided with an inwardly extending projection 26. The projections 26 are each adapted selectively to engage in a selected one of a series of vertically aligned apertures 27, the apertures of each group being correspondingly aligned in a horizontal plane in the apertures of adjacent group in such manner that if each end portion 26 of each hook 25 is engaged in the first, illustratively, aperture of each series, hopper 10 will be maintained in proper perpendicular relation.

From the foregoing, the operation of the device should now be readily understandable. When the hooks 25 are engaged in the uppermost of apertures 27, the end 30 of hopper 10 will be positioned closely adjacent the apex 31 of conical bottom 13, and correspondingly a relatively small amount of feed will be permitted to escape into the pan 11, the level of the feed corresponding to the horizontal plane of the bottom of hopper 10. Correspondingly, as the hooks 25 are selectively engaged with the lower apertures in each vertically aligned group, the bottom 30 of the hopper 10 will be raised to permit an increased amount of feed to be maintained in the pan 11. When the hooks 25 are engaged in the bottom series of apertures of the horizontal plane, pan 11 will be substantially filled to the brim. The arrangement is such that the total length of the groups of apertures 27 in a vertical direction is substantially equal to the depth of the pan 11 so that virtually any quantity of feed from the amount covering the bottom of the pan to an amount substantially filling the same may be provided.

From the foregoing, it will now be seen that there is herein provided an improved round hopper feeder which accomplishes all the objects of this invention including maximum adjustability with a minimum of effort, and others, including many advantages of great practical utility and commercial importance.

As many embodiments may be made of this inventive concept and as many modifications may be made in the embodiment hereinbefore shown and described, it is to be understood that all matter herein is to be interpreted merely as illustrative and not in a limiting sense.

What is claimed is:

1. In a hopper type feeder device, a hopper, a feed pan, a ring surrounding said hopper, a second ring carried on said pan, links connecting said rings, and means securing said first ring to said hopper at one of a selected plurality of points, said means including a plurality of hook-shaped members engageable at selected heights on said hopper.

2. The structure of claim 1 wherein the hopper is provided with a plurality of series of vertically aligned apertures in which said hooks may be selectively engaged.

3. A feeder device comprising a hopper, said hopper having a plurality of vertically spaced and aligned openings formed therein arranged in series at spaced intervals at the periphery thereof, a substantially circular feed pan having a conically shaped bottom wall and a circular side wall, a ring surrounding said hopper, a second ring substantially equal in diameter to the diameter of the feed pan, clips fixedly secured to said second ring, said clips seating said second ring on the rim of said side wall, links connecting said first ring with said second ring, and hooks depending from said first ring for selective insertion in said openings whereby the rate of flow of the feed from the hopper may be adjusted.

4. A feeder device comprising a hopper, said hopper having a plurality of vertically spaced and aligned openings formed therein arranged in series at spaced intervals on the periphery thereof, a feed pan having a conically shaped bottom wall and a circular side wall, a ring surrounding said hopper, a second ring substantially equal in diameter to the diameter of the feed pan, clips fixedly secured to said second ring, said clips seating said second ring on the rim of said side wall, links connecting said first ring with said second ring, and kinematic means pivotally connected to said first ring for selective insertion in said openings whereby the rate of flow of the feed from the hopper may be adjusted.

References Cited in the file of this patent

UNITED STATES PATENTS

| | | |
|---|---|---|
| 1,114,892 | Lawlor | Oct. 27, 1914 |
| 1,131,491 | Drake | Mar. 9, 1915 |
| 1,427,021 | Rudolph | Aug. 22, 1922 |
| 1,836,274 | Norton | Dec. 15, 1931 |
| 2,115,817 | Lahiere | May 3, 1938 |
| 2,383,732 | Niersbach | Aug. 28, 1945 |
| 2,660,150 | Kals | Nov. 24, 1953 |

FOREIGN PATENTS

| | | |
|---|---|---|
| 461,830 | Great Britain | Feb. 25, 1937 |